United States Patent

Kobylinski et al.

[11] Patent Number: 5,507,463
[45] Date of Patent: Apr. 16, 1996

[54] IGNITION NOISE REDUCTION SYSTEM

[75] Inventors: Michael J. Kobylinski, Grand Blanc; Thomas L. Miller, Clarkston, both of Mich.

[73] Assignee: Chrysler Corporation, Highland Park, Mich.

[21] Appl. No.: 255,857

[22] Filed: Jun. 7, 1994

[51] Int. Cl.⁶ .................................................. F16M 13/00
[52] U.S. Cl. .......................................... 248/610; 248/613
[58] Field of Search ........................... 248/60, 610, 613; 267/148, 152, 153; 180/189.2, 296, 309

[56] References Cited

U.S. PATENT DOCUMENTS

| | | | |
|---|---|---|---|
| 2,160,808 | 9/1939 | Bradley | 248/610 |
| 2,842,218 | 7/1958 | Bradbury | 248/60 |
| 4,296,907 | 10/1981 | Ishida et al. | 248/573 |
| 4,465,252 | 8/1984 | Donovan, Jr. et al. | 248/60 |
| 4,727,957 | 3/1988 | Fujita | 181/208 |
| 4,796,841 | 1/1989 | Baker et al. | 248/60 |
| 4,806,437 | 2/1989 | Yokoi et al. | 267/153 |
| 4,988,070 | 1/1991 | Hollinger et al. | 248/613 |
| 5,127,489 | 7/1992 | Takato et al. | 248/60 |
| 5,197,698 | 3/1993 | Bartholomew | 248/60 |

FOREIGN PATENT DOCUMENTS

| | | | |
|---|---|---|---|
| 1434349 | 2/1965 | France | 267/152 |
| 1077540 | 3/1960 | Germany | 267/152 |
| 269614 | 10/1989 | Japan | 180/296 |

Primary Examiner—Leslie A. Braun
Assistant Examiner—Gwendolin Wrenn
Attorney, Agent, or Firm—Margaret A. Dobrowitsky

[57] ABSTRACT

An elastomeric, electrically conductive coupling member facilitates suspending a vehicle exhaust system from the underside of the vehicle while concomitantly effectively grounding out the exhaust system through an electrical connection to the underside of the vehicle. The inventive coupling member is preferably made of an elastomeric material that is impregnated with a conductive material such as metal or carbon. Electromagnetic emissions from the vehicle ignition system are reduced through the electrical coupling between the underside of the vehicle and the vehicle exhaust system which thereby improves radio reception by preventing or reducing the vehicle ignition system noise that otherwise interferes with radio reception.

13 Claims, 1 Drawing Sheet

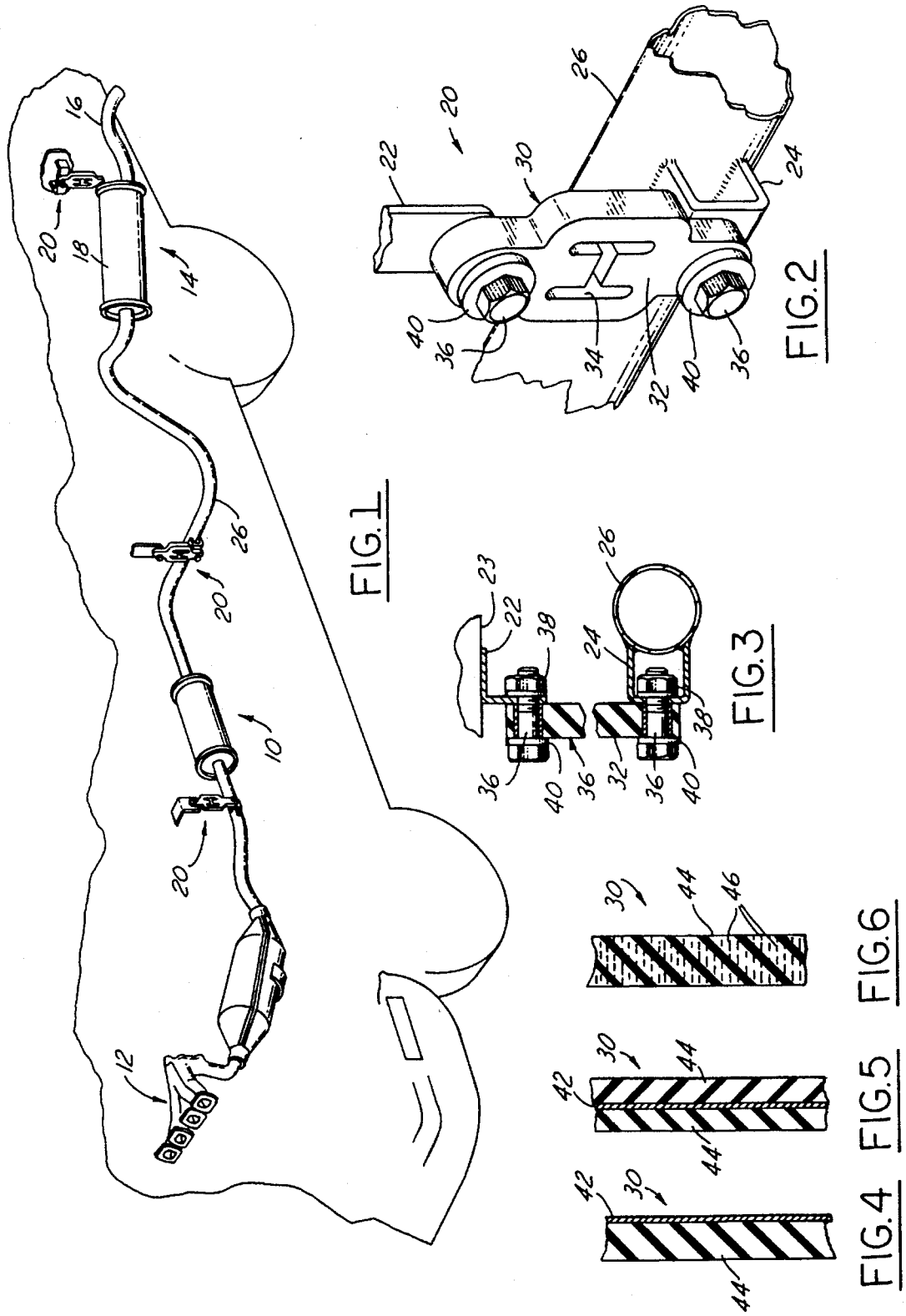

IGNITION NOISE REDUCTION SYSTEM

BACKGROUND OF THE INVENTION

1. Field of the Invention

This invention relates generally to systems for reducing ignition noise in automotive vehicles, and more particularly to a system for electrically coupling a vehicle exhaust system to the underside of the vehicle in order to reduce electromagnetic emissions from the vehicle ignition system.

2. Description of the Prior Art

Conventional exhaust system hangers for automotive vehicles include a rubber hanger that is used to suspend portions of the exhaust system from the underside of the vehicle. Rubber hangers are used in order to provide flexibility such that uneven road conditions do not impart stress onto the exhaust system as it moves relative to the underside of the vehicle in response to the uneven road conditions. Conventional exhaust hangers are used in various combinations that typically include one or more clamps on the underside of the vehicle that corroborate with the rubber exhaust system hangers in order to properly suspend the exhaust system from the underside of the vehicle.

It is a recognized problem in modern day automotive vehicles, that electromagnetic emissions from the vehicle ignition system can cause undesirable interference or noise that reduces the quality of reception of a vehicle radio system. Typically, a special device is inserted when the radio system is installed in the vehicle in order to block out or reduce the noise otherwise caused by the electromagnetic emissions from the ignition system.

It is also well known that a vehicle exhaust system can act as an antenna. The connection between a vehicle exhaust system and the engine, combined with the electromagnetic emissions from the vehicle ignition system, can introduce additional interference to proper radio reception. It is therefore desirable to alter the exhaust system or antenna characteristics in order to improve radio reception by reducing the radiated ignition noise emissions.

This invention recognizes that it is possible to alter the exhaust system or antenna characteristics by adding additional ground points along the system in order to provide an electrically grounded antenna (i.e., the exhaust system) to thereby reduce the radiated ignition system noise emissions and accordingly to improve radio reception. This invention includes an innovative exhaust hanger that has an electrically conductive elastomeric coupling member that facilitates suspending the exhaust system from the underside of the vehicle such that additional grounding points are provided along the exhaust system.

SUMMARY OF THE INVENTION

In most general terms, this invention provides a system for reducing undesirable electromagnetic emissions from a vehicle emission system that can interfere with radio reception. The system provided by this invention includes a first exhaust system hanger member that is made of an electrically conductive material and is disposed on the underside of the vehicle. A second exhaust system hanger member that is also electrically conductive is connected directly to the vehicle exhaust system. An elastomeric, electrically conductive coupling member couples the first hanger member to the second hanger member such that an electrical connection is effected between the vehicle exhaust system and the underside of the vehicle. Accordingly, the undesirable electromagnetic vehicle ignition system emissions are reduced through the grounding or electrical connection between the vehicle exhaust system and the underside of the vehicle.

In one preferred embodiment, the elastomeric, electrically conductive coupling member is made up of an elastomeric body portion that is impregnated with a conductive material. The most preferred conductive material is metal while a second preferred conductive material is carbon, either of which is integrated within the elastomeric body portion such that a substantially continuous, conductive path is provided through the elastomeric body portion.

Alternate embodiments include providing a flexible conductive strap along an outer surface of an elastomeric body portion of the coupling member or integrating a flexible conductive strap within the interior of the elastomeric body portion.

These and other objects and features of this invention will become apparent to those skilled in the art from the following detailed description of the preferred embodiments in view of the appended drawings.

BRIEF DESCRIPTION OF THE DRAWINGS

FIG. 1 is a diagrammatic illustration of a vehicle exhaust system suspended from the underside of a vehicle in accordance with this invention.

FIG. 2 is perspective diagrammatic view of an elastomeric, electrically conductive coupling member designed in accordance with this invention.

FIG. 3 is a side, partial cross-sectional, view of the embodiment of FIG. 2.

FIG. 4 is a side cross-sectional view of one embodiment of the electrically conductive coupling member designed in accordance with this invention.

FIG. 5 is a side cross-sectional view of another embodiment of the electrically conductive coupling member designed in accordance with this invention.

FIG. 6 is a side cross-sectional view of the most preferred embodiment of the electrically conductive elastomeric coupling member designed in accordance with this invention.

DETAILED DESCRIPTION OF THE PREFERRED EMBODIMENTS

FIG. 1 shows, in diagrammatic representation, a vehicle exhaust system 10 as it is suspended from the underside of a vehicle. Vehicle exhaust system 10 includes a conventional first end 12, which is coupled with the vehicle engine. Second end 14 of the exhaust system 10 includes a tailpipe 16 and muffler 18. Hangers 20 are used to suspend the vehicle exhaust system 10 from the underside of the vehicle in such manner that the advantages of this invention are provided as will be described in further detail below.

Referring now to FIGS. 2 and 3, the details of the hanger 20 are shown. Hanger 20 includes first hanger member 22 that is directly coupled to the underside of the vehicle 23 in a conventional manner. Second hanger member 24 is directly connected to exhaust pipe 26, which is a portion of the exhaust system 10. The first and second hanger members 22 and 24 are preferably made of metal, stainless steel or any other electrically conductive material that provides the strength and stability needed in order to effect a proper suspension of the exhaust system 10 from the underside of the vehicle.

Coupling member 30 is provided between the first and second hanger members 22 and 24. Coupling member 30 includes elastomeric body portion 32. The H-shaped opening 34 is defined through the center of the elastomeric body portion 32. The H-shaped opening 34 can be established during conventional molding or forming processes of the elastomeric body portion 32, or alternatively, can be cut into the elastomeric body portion 32 after the molding or forming process is complete. Coupling member 30 joins or connects first hanger member 22 to second hanger member 24, in the embodiment illustrated in FIGS. 2 and 3, by bolts 36 and nuts 38. Alternatively, other fasteners such as pin and snap ring combinations can be used. Whatever fastener is used, it is preferably made up of an electrically conductive material in order to facilitate the electrical connection between the underside of the vehicle and the exhaust system 10. In the embodiments illustrated in FIG. 2 and 3, washers 40 are provided in order to reduce undesirable wear on the elastomeric body 32 of coupling member 30.

It is a well known and recognized phenomena that a vehicle exhaust system can act as an antenna that is responsive to electromagnetic waves. This invention provides an electrically conductive coupling member 30 that alters the exhaust system characteristics by providing additional ground points between the vehicle exhaust system 10 and the underside of the vehicle. That is, providing the electrically conductive coupling member 30 effectively grounds out the exhaust system "antenna" by electrically coupling it to the underside of the vehicle. By grounding the exhaust system "antenna" in this manner, the vehicle radio reception, in both amplitude modulation and frequency modulation modes, is in improved because the ignition system electromagnetic emissions that are otherwise radiated are reduced. The grounding of the vehicle exhaust system 10 reduces the electromagnetic emissions from the vehicle ignition system and inhibits those electromagnetic emissions from coupling into the vehicle radio system, thereby improving radio reception.

It is necessary to provide a flexible, resilient suspension of a vehicle exhaust system from the underside of the vehicle. Accordingly, the coupling member 30 of this invention includes an elastomeric body portion that further includes a conductive material to effect the electrical coupling between the underside of the vehicle and the vehicle exhaust system 10. FIG. 4 shows one embodiment of a coupling member 30 in cross-sectional view. The embodiment of FIG. 4 includes a conductive strap 42 along one outer surface of the elastomeric portion 44 of elastomeric body 32. The embodiment of FIG. 5 includes a conductive strap 42 disposed or integrated within the elastomeric portion 42 of elastomeric body 32.

FIG. 6 shows the most preferred embodiment of coupling member 30. The embodiment of FIG. 6 includes a conductive material such as metal or carbon that is impregnated within the elastomeric body 32 of coupling member 30. The metal or carbon particles that are impregnated through the elastomeric body 32 are illustrated schematically by the lines 46 in FIG. 6. A sufficient amount of metal or carbon is preferably impregnated throughout the elastomeric body 32 such that a substantially continuous, electrically conductive pathway is provided through the entire length of coupling member 30. An elastomeric material that is impregnated with a conductive material such as metal is also referred to herein as an electrically conductive elastomeric material. The elastomeric material is impregnated with the conductive material in a conventional manner.

It is important to maintain flexibility within coupling member 30 such that the suspension of the vehicle exhaust system 10 from the underside of the vehicle provides a sufficient amount of relative movement between the exhaust system and the vehicle during uneven driving conditions, for example. Accordingly, a conductive strap 42 such as that illustrated in FIGS. 4 and 5 must necessarily be of a flexible, durable nature in order to maintain its integrity while withstanding the stresses that are imposed upon a coupling member. Similarly, the amount of conductive material impregnated into the elastomeric body 32 (such as illustrated schematically in FIG. 6) should be of an amount sufficient to provide the electric conductivity required, according to this invention, while at the same time maintaining the flexibility inherent in the elastomeric qualities of coupling member 30.

The preceding description is exemplary rather than limiting in nature. Variations and modifications of the preferred embodiments disclosed above will become apparent to those skilled in the art that do not depart from the purview and spirit of this invention. The scope of this invention is to be limited only by the appended claims.

We claim:

1. A system for reducing undesirable electromagnetic emissions from a vehicle ignition system, comprising:

a first exhaust system hanger member adapted to be disposed on the underside of a vehicle, said first hanger member being made of an electrically conductive material;

a second exhaust system hanger member connected to a vehicle exhaust system, said second hanger member being made of an electrically conductive material; and an elastomeric, electrically conductive coupling member coupling said first hanger member to said second hanger member for electrically coupling the vehicle exhaust system to the underside of the vehicle and for reducing undesirable electromagnetic vehicle ignition system emissions wherein said coupling member comprises an elastomeric material impregnated with electrically conductive material particles substantially throughout said coupling member.

2. The system of claim 1, wherein said electrically conductive material particles comprise metal.

3. The system of claim 1, wherein said coupling member has a generally H-shaped opening through a mid-portion thereof and further comprises an elastomeric material and wherein a substantially flexible electrically conductive material is disposed through a portion of said coupling member such that said conductive material is in electrical contact with said first and second hanger members when said hanger members are coupled by said coupling member.

4. The system of claim 1, wherein said coupling member comprises an elastomeric body and wherein a substantially flexible electrically conductive strap is disposed on an outer surface of said elastomeric body, said strap being connected to said first and second hanger members when said hanger members are coupled by said coupling member.

5. The system of claim 1, wherein said coupling member comprises an electrically conductive elastomeric material.

6. The system of claim 5, wherein said electrically conductive elastomeric material includes particles of a conductive material.

7. The system of claim 6, wherein said particles comprise carbon.

8. A device for reducing undesirable electromagnetic emissions from a vehicle ignition system, on a vehicle having a metal exhaust system that includes a first hanger member disposed on the underside of the vehicle and a second hanger member directly connected to the vehicle exhaust system, comprising:

a flexible coupling member for coupling the first hanger member with the second hanger member; and a electrically conductive coupling member for coupling the underside of the vehicle and the exhaust system and for grounding out electromagnetic emissions from the vehicle ignition system, wherein said coupling member has an elastomeric body that is impregnated with particles of an electrically conductive material substantially throughout said body.

9. The device of claim 8, wherein said particles of electrically conductive material comprise metal.

10. The device of claim 8, wherein said particles of electrically conductive material comprise carbon.

11. The device of claim 8, wherein said coupling member comprises and elastomeric material having a generally H-shaped hole through a mid-portion thereof and wherein a substantially flexible electrically conductive material is disposed through a portion of said coupling member such that said conductive material is in electrical contact with said first and second hanger members when said hanger members are coupled by said coupling member.

12. The device of claim 8, wherein said coupling member comprises an elastomeric body and wherein a substantially flexible electrically conductive strap is disposed on an outer surface of said elastomeric body, said strap being electrically connected to said first and second hanger members when said hanger members are coupled by said coupling member.

13. The device, of claim 8, wherein said coupling member comprises and electrically conductive elastomeric material.

* * * * *